(12) United States Patent
Ishikawa

(10) Patent No.: US 9,950,587 B2
(45) Date of Patent: Apr. 24, 2018

(54) INCLINATION DETECTION METHOD, INCLINATION DETECTION APPARATUS, AND EQUIPMENT FOR DETECTING INCLINATION

(71) Applicant: HITACHI, LTD., Tokyo (JP)

(72) Inventor: Tadaaki Ishikawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 21 days.

(21) Appl. No.: 14/992,377

(22) Filed: Jan. 11, 2016

(65) Prior Publication Data

US 2016/0280036 A1    Sep. 29, 2016

(30) Foreign Application Priority Data

Mar. 26, 2015    (JP) .................. 2015-064575

(51) Int. Cl.
| | | |
|---|---|---|
| *B60G 17/019* | (2006.01) | |
| *G01C 9/06* | (2006.01) | |
| *G05D 1/02* | (2006.01) | |
| *G05D 1/08* | (2006.01) | |

(52) U.S. Cl.
CPC ......... *B60G 17/01908* (2013.01); *G01C 9/06* (2013.01); *G05D 1/0236* (2013.01); *G05D 1/0891* (2013.01); *G01C 2009/066* (2013.01); *G05D 2201/0216* (2013.01)

(58) Field of Classification Search
CPC ........... B60G 17/01908; G05D 1/0236; G05D 1/0891; G01C 9/06
USPC ........................................................ 701/36
See application file for complete search history.

(56) References Cited

FOREIGN PATENT DOCUMENTS

| JP | 60067812 A | * | 4/1985 | ............. G01B 11/26 |
|---|---|---|---|---|
| JP | H05-346460 A | | 12/1993 | |
| JP | 2001-075645 A | | 3/2001 | |
| JP | 2002-188918 A | | 7/2002 | |
| JP | 2003-138531 A | | 5/2003 | |

OTHER PUBLICATIONS

Machine Translation: Tsumura, JP 60067812 A (also JP S6067812), Apr. 1985, Japanese Patent Publication.*
Jan. 30, 2018 Office Action issued in Japanese Patent Application No. 2015-064575.

* cited by examiner

*Primary Examiner* — Kimberly S Berona
*Assistant Examiner* — Nadeem Odeh
(74) *Attorney, Agent, or Firm* — Oliff PLC

(57) ABSTRACT

An inclination detection apparatus detects the inclination of a mobile body with three marker rods having different inclinations with respect to one another. The mobile body is provided with a laser range finder irradiating surrounding objects with a laser beam to light a point on each of the three marker rods as a reflection point from which the laser beam is reflected back. The inclination detection apparatus includes a processor and a storage device storing relative positional information of the three marker rods. The processor obtains positional information of reflection points, obtains relative positions of the reflection points on the three marker rods by determining points on the three marker rods corresponding to the obtained positional information based on the relative positional information of the three marker rods, and identifies an inclination plane including the obtained relative positions of the reflection points as the inclination of the mobile body.

12 Claims, 9 Drawing Sheets

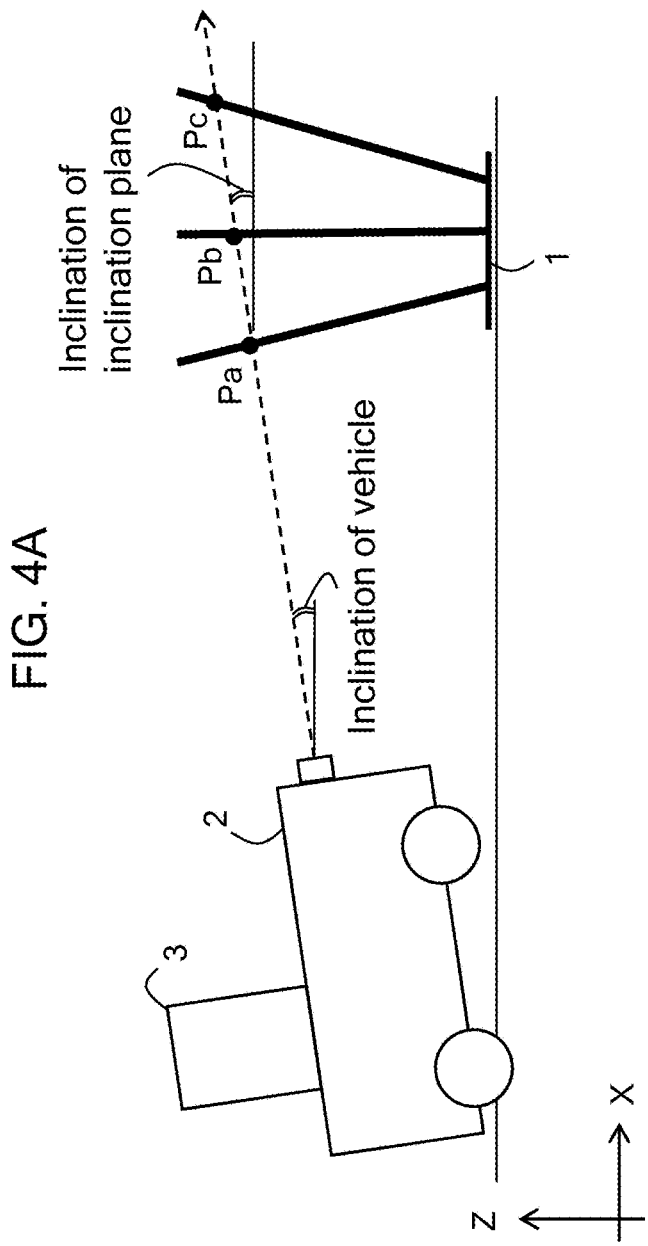

INCLINATION DETECTION METHOD, INCLINATION DETECTION APPARATUS, AND EQUIPMENT FOR DETECTING INCLINATION

FIELD OF THE INVENTION

The present invention relates to an inclination detection method, an inclination detection apparatus, and equipment for detecting inclination.

DESCRIPTION OF THE PRIOR ART

In large-scale factories, warehouses serving as a transfer point in physical distribution, and hospitals needing provision of meals as well as collection and distribution of laundry, automated guided vehicles and mobile robots having a transfer function are common for the purpose of labor-saving in article transfer. These unmanned transfer vehicles transfer articles with the articles being carried directly on the vehicle, or put in a shelf, a tray, or a container, which is carried on the vehicle.

When an unmanned transfer vehicle is in automatic operation, it is necessary to make the vehicle recognize the position of the vehicle itself. Many unmanned transfer vehicles have been configured to determine individual positions of the vehicles themselves by utilizing white line markers, barcode markers, magnetic markers, RFID tags, and the like installed on a floor surface as markers for position recognition. However, the position recognition of unmanned vehicles nowadays are conducted often with a guidance system using a laser range finder (LRF) fixed on an unmanned transfer vehicle and map information, in consideration that it takes a lot of time and effort to accurately install markers on predetermined positions and that the markers installed on a floor surface are likely to become unusable due to a breakage of or stain on the marker.

A general two-dimensional LRF emits laser beams around the LRF in such a manner as to scan a plane and measures distance to an object based on the time for the laser beam to light the object and return to the LRF as reflection light, and thus the detection plane of such an LRF forms a two dimensional place. The unmanned transfer vehicle then compares the two-dimensional positional information of surrounding objects obtained by the LRF with a map prepared in advance, determines the position of the vehicle itself, and travels according to a preset route-following program.

A surrounding object the distance to which is to be measured can be anything as long as the laser beam spot on that object can be detected by a photodetector of the LRF. For example, a wall, a pillar, or a casing of an installed apparatus can be used as is. Some type of LRF measures a distance based on the positions of a photoemitter and a photodetector by means of the triangulation principle. The detection plane of such an LRF also forms a two dimensional plane.

When an unmanned transfer vehicle is in automatic operation, it is necessary to make the vehicle recognize the inclination of the vehicle itself. Due to improved performance of unmanned transfer vehicles and evolution in physical distribution systems, there has been an increasing demand for unmanned transfer vehicles to transfer heavy articles and tall articles such as a shelf. To transfer an article safely or accurately, it is necessary for an unmanned transfer vehicle to recognize the inclination of the vehicle itself on which an article to be transferred has been loaded.

Examples of means for recognizing the inclination of an unmanned transfer vehicle include a general tiltmeter and a general gyro, which utilize gravity. However, integration of such a measurement device into a transfer vehicle will cause problems concerning cost and maintenance. Hence, Japanese Unexamined Patent Application Publication No. 2001-075645 (patent literature 1) proposes a method for measuring the inclination of a vehicle body by utilizing an LRF.

The layout of a warehouse, in which operation routes on which unmanned transfer vehicles travel are to be defined, is often altered for example due to changes in the stock status of the warehouse. Thus, for the purpose of following layout changes, it is desirable to save time and effort for preparing preliminary information for calculating the inclination of unmanned transfer vehicles.

Unfortunately, the method of the patent literature 1 requires that positional information of retroreflectors, which are to reflect the laser beam from an LRF, be input in advance per each retroreflector, and thus moving retroreflectors according to a layout change requires significant time and effort for inputting the positional information of the retroreflectors again.

SUMMARY OF THE INVENTION

In view of the above, a major object of the present invention is to detect the inclination of a mobile body in such a manner that it is possible to flexibly support changes made in the travel route of the mobile body.

In order to solve the above problem, an aspect of the present invention provides an inclination detection apparatus for detecting an inclination of a mobile body with three marker rods having different inclinations with respect to one another. The mobile body is provided with a laser range finder. The laser range finder irradiates surrounding objects with a laser beam to light a point on each of the three marker rods as a reflection point from which the laser beam is reflected back to the laser range finder. The inclination detection apparatus includes a storage device and a processor. The storage device stores relative positional information of the three marker rods. The processor is configured to: obtain positional information of reflection points, obtain relative positions of the reflection points on the three marker rods by determining points on the three marker rods corresponding to the obtained positional information based on the relative positional information of the three marker rods, and identify an inclination plane including the obtained relative positions of the reflection points as the inclination of the mobile body.

Other aspects of the invention will be explained below in the embodiments embodying the invention.

According to the present invention, the inclination of a mobile body can be detected in such a manner that it is possible to flexibly support changes in the route of the mobile body.

BRIEF DESCRIPTION OF THE DRAWINGS

FIG. 1A is a perspective view; FIG. 1B is a plan view as viewed directly from the top of the transfer vehicle; and FIG. 1C is a side view as viewed directly from a side of the transfer vehicle.

FIG. 3A is an explanatory diagram for explaining a process of detecting the reflection points of the laser beam relative to an LRF; FIG. 3B is an explanatory diagram for explaining a process of forming a triangle from the positions of the reflection points detected in the process explained with FIG. 3A, to obtain the lengths of the sides of the triangle; and FIG. 3C is an explanatory diagram showing that an inclination plane is obtained by determining points on marker rods of a maker which form a triangle having the same lengths of sides as the lengths of the sides of the triangle obtained in the process explained with FIG. 3B.

FIGS. 4A to 4C are schematic diagrams showing examples of the inclination plane to be detected by the embodiment of the invention, where FIG. 4A shows an inclination plane formed when the transfer vehicle has an inclination with a front portion of the transfer vehicle being raised (bends oneself back); FIG. 4B shows an inclination plane formed when the transfer vehicle has an inclination with the front portion of the transfer vehicle being lowered (bends oneself forward); and FIG. 4C shows an inclination plane formed when the transfer vehicle goes up a slope.

FIG. 5A is a plan view illustrating an inclined transfer vehicle with an article loaded on a loading platform of the vehicle; FIG. 5B is a plan view illustrating that the article has been restored to its level position by adjusting the loading platform. FIG. 5C is a plan view illustrating an inclined transfer vehicle provided with actuators between the vehicle body and wheel shafts; FIG. 5D is a plan view illustrating that the whole of the vehicle has been restored to its level position by adjusting the actuators.

DESCRIPTION OF THE PREFERRED EMBODIMENTS

An embodiment of the present invention will now be described in detail with reference to the accompanying drawings.

Figure 1A:
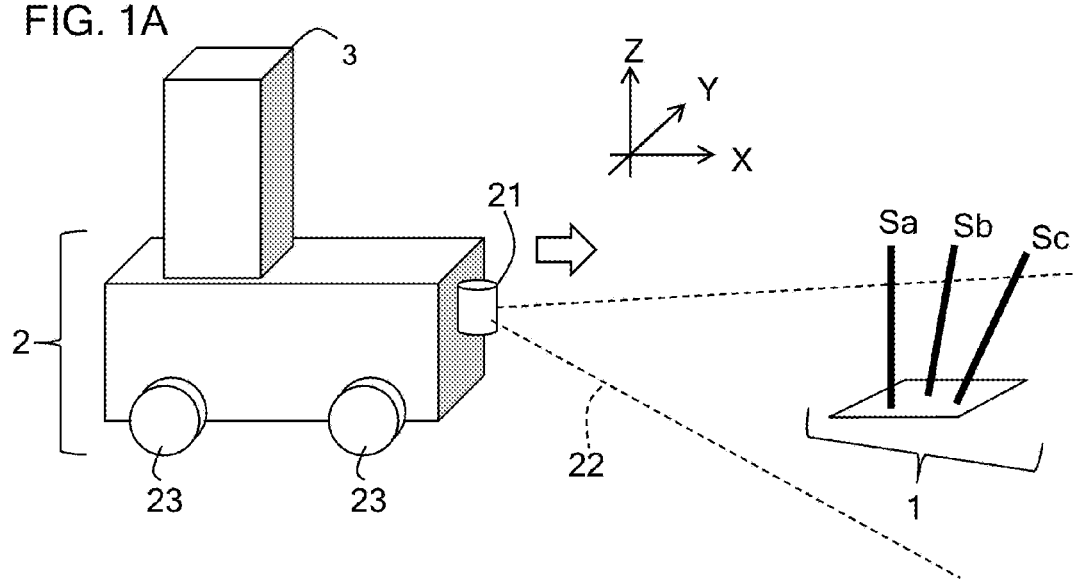
FIGS. 1A to 1C are views showing that, in an embodiment of the invention, a transfer vehicle on which an article to be transferred has been loaded irradiates a marker with a laser beam, where

FIG. 1A is a perspective view showing that a transfer vehicle 2 on which an article 3 to be transferred has been loaded irradiates a marker (equipment for detecting an inclination) with a laser beam 22;

The transfer vehicle 2 is a mobile body such as an unmanned transfer vehicle or a mobile robot which is used for transferring articles for example in a factory, a warehouse, or a hospital. The transfer vehicle 2 travels with the front and rear wheels 23 thereof, and transfers an article 3 loaded on the vehicle. The transfer vehicle 2 is provided with a laser range finder (LRF) 21 fixed thereon for automatic (unmanned) operation. Herein, "fixed" means that the mount position of the LRF 21 relative to the transfer vehicle 2 is fixed.

The LRF 21 is for example mounted at a front portion (in the direction of travel) of the transfer vehicle 2. The LRF 21 emits a laser beam 22 and detects reflection light. That is, the laser beam is reflected back from an object and detected. Thus an obstacle located ahead in the direction of travel can be detected and thus a collision with that object can be avoided. The transfer vehicle 2 may be additionally provided with a collision avoidance mechanism or a mechanism for making an emergency stop upon detection of a contact so that damage caused by an accident can be limited to a minimum.

The laser beam 22 is emitted to a marker 1 placed ahead in the direction of travel, and the reflection light therefrom is detected by the LRF 21.

Since the transfer vehicle 2 travels on a flat floor surface in general, it is expected that the loaded article 3 to be transferred will not fall. However, in the case of an uneven floor surface or wheels 23 having worn rubber, the loaded article 3 may incline. Even at a small inclination of the order of 1 mm, the article 3 may fall when it is a tall rack, for example. In addition, even though the article 3 may not fall, a part of the article 3 may be caught by a narrow transfer passage.

In the present embodiment, in order to transfer the article 3 in a stable manner, a marker 1 and an inclination detection apparatus are provided as means to detect the inclination of the transfer vehicle 2 in addition to the above described LRF 21.

The marker 1 has three marker rods Sa, Sb, and Sc to reflect the laser beam 22 coming from the LRF 21 by three points. That is, a point on a marker rod becomes a reflection point from which the laser beam 22 is reflected. The marker 1 has a plate at a lower end thereof to fix the positions of the three marker rods Sa, Sb, and Sc.

In order to increase the reflection rate of the laser beam 22 reflected back from a marker rod to the LRF, each of the marker rods is preferably covered by a retroreflective material having a higher reflectance toward in a direction to the LRF 21 than surrounding objects. Details of the three marker rods Sa, Sb, and Sc, such as inclinations thereof, will be described later with referring to FIG. 3 and subsequent FIGS. It is to be noted that the number of the marker rods is not limited to three, but may be four or more (i.e., the number of the reflection points may be four or more), because the reflection points need only to be able to form an inclination plane.

The marker 1 can be transferred and placed at a measurement place in the vicinity of the transfer route of the transfer vehicle 2. The position and orientation of the marker 1 need not be manually input as data in advance by an administrator nor automatically input by measurement means using a global positioning system (GPS) or the like. This makes it possible to flexibly change the layout plan of a warehouse in which the article 3 to be transferred is stored, thus increasing the flexibility of the layout.

The three marker rods Sa, Sb, and Sc need to be placed in such a manner that the three rods can be separately seen from the LRF 21 because if some of the three rods are overlapped the number of the reflection points becomes less than three. The marker 1 is preferably placed in the vicinity of a location where the transfer vehicle 2 is likely to incline, such as an uneven floor or an inclined floor.

The inclination detection apparatus (not shown) computes the inclination of the transfer vehicle 2 based on the positions of the three reflection points, each of which is respectively measured by the LRF 21 with respect to one of the three marker rods Sa, Sb, and Sc. The inclination detection apparatus is a computing machine such as a personal computer (PC) provided with a central processing unit (CPU) and a memory, in which computing machine a process unit is configured by the CPU loading program from storage means to the memory and executing the program loaded.

When, for example, the inclination detection apparatus finds three measurement objects in a specific range, the apparatus recognize them as three marker rods Sa, Sb, and Sc.

The inclination detection apparatus may be, for example, attached to the marker 1, mounted in the casing of the LRF 21, mounted in the casing of the transfer vehicle 2, or installed in a casing separated from them. That is, the inclination detection apparatus may be in any configuration as long as the apparatus can receive measurement data from the LRF 21.

Figure 1B:
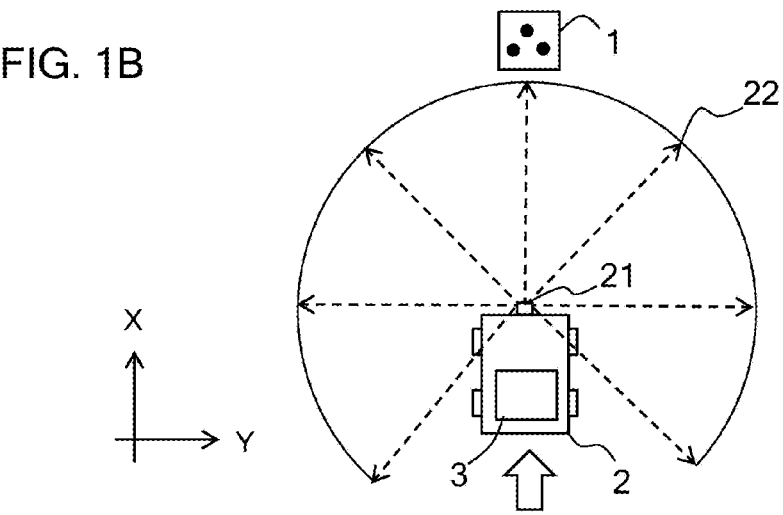

FIG. 1B is a plan view of the transfer vehicle 2 as viewed directly from the top thereof. In this plan view, an X axis represents the direction of travel, and a Y axis represents a sideward direction perpendicular to the X axis. The LRF 21 emits (scans) a laser beam 22 with changing the angle thereof by a predetermined increment (e.g., 5 degrees) in a predetermined range relative to the forward front of the transfer vehicle 2 (e.g., in a range of 270 degrees excluding vehicle rear). That is, the laser beam 22 is emitted in an XY plane (two dimensional plane), thereby allowing detection of the marker 1 situated in the vicinity of the transfer vehicle 2.

Figure 1C:
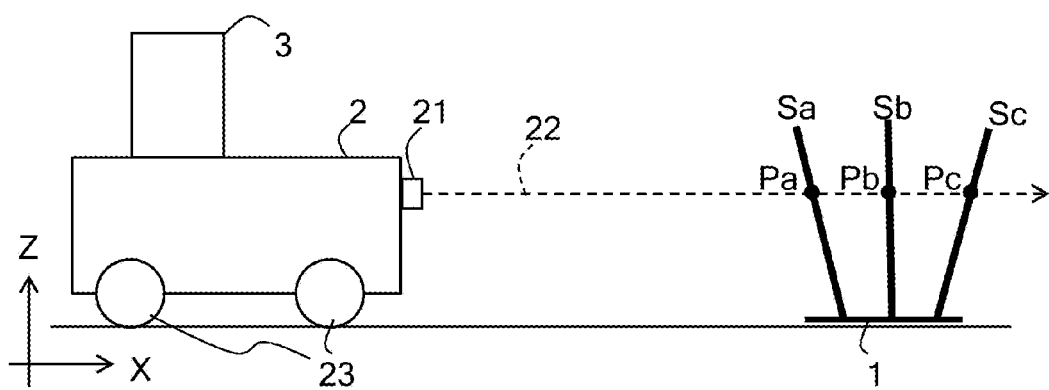

FIG. 1C is a side view of the transfer vehicle 2 as viewed directly from a side thereof. In this plan view, an X axis represents the direction of travel, and a Z axis represents a height direction. The LRF 21 emits the laser beam 22 in the XY plane shown in FIG. 1B at a fixed predetermined angle relative to the Z axis (in the figure, at an angle of 0 degree, i.e., the horizontal direction). Note that, in the following description, the positions on the three marker rods Sa, Sb, and Sc at which the laser beam 22 is reflected are respectively denoted by Pa, Pb, and Pc.

The plane containing Pa, Pb, and Pc (hereinafter referred to as "inclination plane") represents the inclination of the transfer vehicle 2 itself. For example, in FIG. 1C, the inclination plane is parallel with the floor surface, indicating a state in which the article 3 to be transferred is stable.

Figure 2:
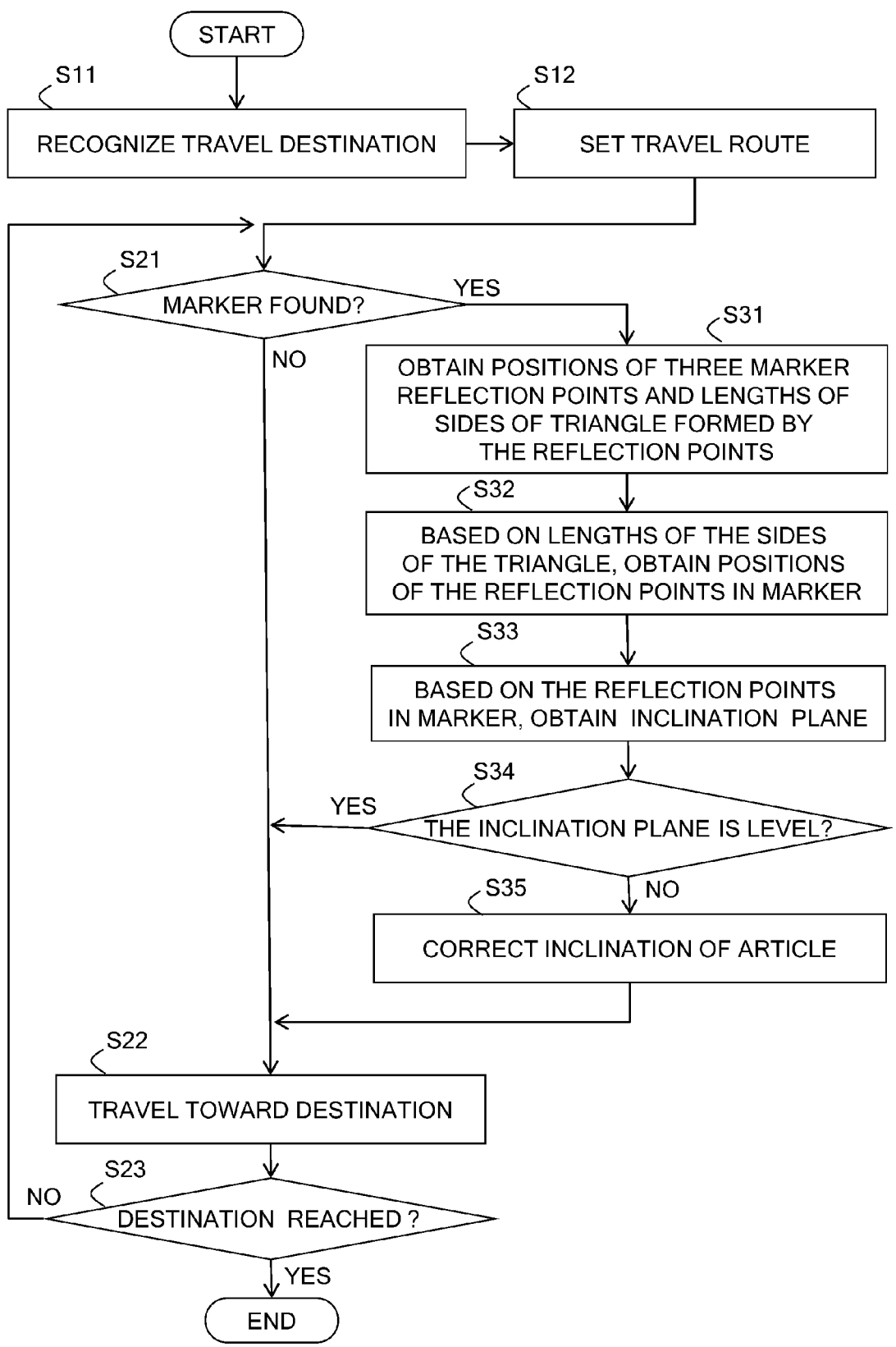
FIG. 2 is a flowchart showing a process of the transfer vehicle to travel, which process includes an inclination detection process by an inclination detection apparatus according to the embodiment of the invention.

FIG. 2 is a flowchart showing a process of the transfer vehicle 2 to travel, which process includes an inclination detection process performed by the inclination detection apparatus. Hereinafter, referring to FIG. 3 and subsequent figures as needed, each of process steps will be described along with FIG. 2. At step S11, when the transfer vehicle 2 recognizes a travel destination based on an input from a user or the like, the transfer vehicle 2 activates the LRF 21 and makes the LRF 21 start emission of a laser beam 22.

At step S12, the transfer vehicle 2 sets a travel route from the current position to the travel destination, for example according to the result of a route search performed by a navigation system.

In the travel process of the transfer vehicle 2 on the travel route, which will be described below, the transfer vehicle 2 may or may not have loaded the article 3 to be transferred. That means execution of processes for detecting an inclination of the transfer vehicle 2 and for correcting the inclination is not limited to when the article 3 has been loaded.

At step S21, the LRF 21 determines whether a marker 1 in the vicinity of the LRF 21 is found by reflection of a laser beam emitted from the LRF 21 from the current position. If YES at step S21, the flow proceeds to step S31; if NO, the flow proceeds to step S22.

At step S22, the transfer vehicle 2 travels toward the travel destination recognized in step S11 along the travel route set in step S12. Optionally, the transfer vehicle 2 may be configured to, when a marker 1 is found in step S21, change the route set in step S 12 in consideration of the width of the vehicle including the article 3 based on the inclination of the vehicle. A route change during travel can be carried out by comparing the measured distance data of the surroundings obtained by the LRF 21 with map data embedded in the transfer vehicle 2.

At step S23, the transfer vehicle 2 determines, after the transfer vehicle 2 has traveled a predetermined distance or after a predetermined period of time has elapsed, whether the transfer vehicle 2 has reached the travel destination. If the travel destination has been reached (YES at step S23), the travel process is terminated, otherwise (NO at step S23) the process returns to step S21.

If Yes at step S21, the inclination detection apparatus uses the detection of the marker 1 as a trigger signal of special operations. During the time in which the marker 1 is being detected, the inclination detection apparatus continue measuring the inclination of the vehicle body (steps S31 to S33 described below) and making an adjustment to keep the loaded article in a level position (steps S34 and S35 described below) while the transfer vehicle travels. Hereinafter, details of each of the process steps (steps S31 to S35) of the inclination detection apparatus will be described.

At step S31, the inclination detection apparatus obtains the positions of the three reflection points of the marker 1 and the length of the sides of the triangle formed by the reflection points as described below.

Figure 3A:
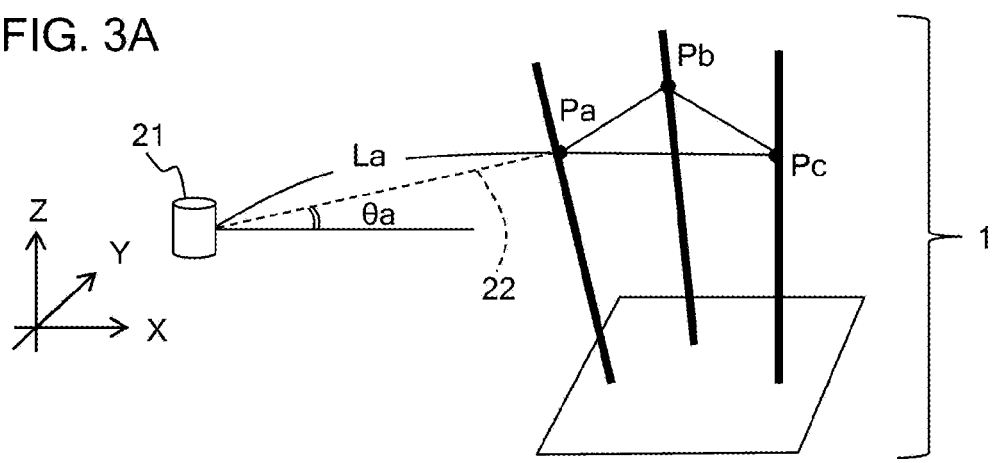
FIGS. 3A to 3C are explanatory diagrams for explaining an inclination detection process according to the embodiment of the invention, where

FIG. 3A is an explanatory diagram for explaining a process of detecting the reflection points Pa, Pb, and Pc relative to the LRF 21. Hereinafter, although the detection process will be described with a focus on the reflection point Pa, the other reflection points Pb and Pc can be detected by the same processing as well.

The laser beam 22 emitted from the LRF 21 is reflected at the reflection point Pa on the marker rod Sa, and the reflection light of the laser beam returns to the LRF 21.

Therefore, a reflection point distance La, which is the distance from LRF 21 to the reflection point Pa, can be computed from the time for the laser beam to reach the reflection point Pa and be reflected back to LRF 21 (i.e., reflection light arrival time—laser beam emission time). In addition, the emission angle θa of the laser beam is predetermined at the time of emission. That is, the position of the reflection point Pa can be obtained as a combination of the distance La to the reflection point and the emission angle θa.

Figure 3B:
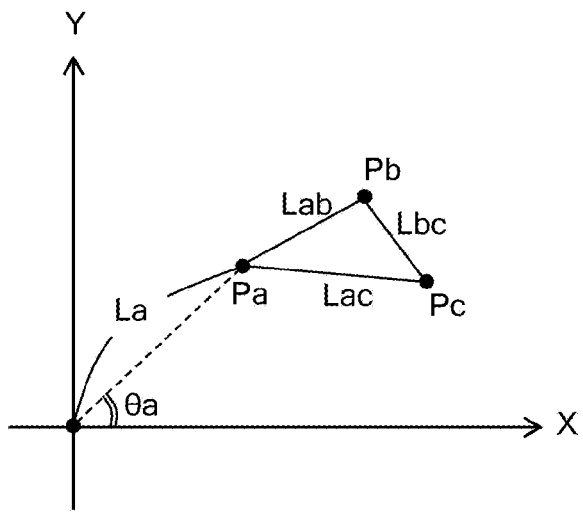

FIG. 3B is an explanatory diagram for explaining a process of forming a triangle from the positions (sets of a distance to reflection point and an emission angle θ) of the reflection points detected in the process explained with FIG. 3A and obtaining each length of the sides Lab, Lac, and Lbc of the triangle.

Positions of the reflection points are each represented in a polar coordinate system (distance to reflection point, emission angle θ), and a triangle whose three vertexes correspond to the three reflection points is formed. The sides of the triangle are respectively denoted Lab, Lbc, and Lac. Herein, the side connecting the reflection points Pa and Pb is denoted Lab, indicating "a" and "b" in subscripts.

At Step S32, the inclination detection apparatus obtains positions of the reflection points in the marker based on the lengths of the sides of the triangle obtained in the process explained with FIG. 3B.

Figure 3C:
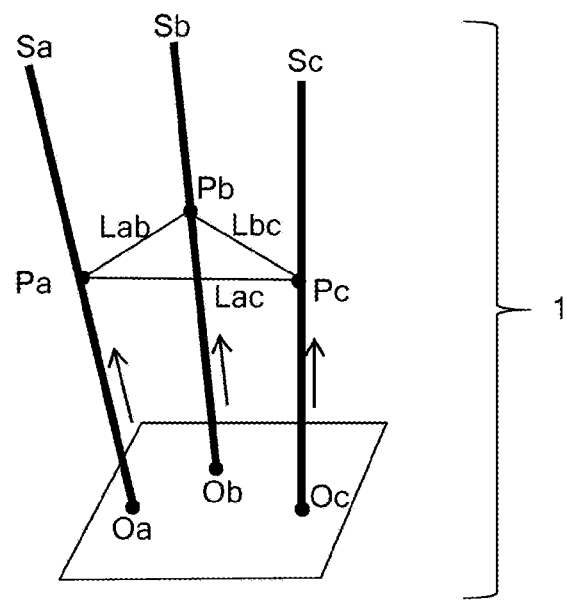

FIG. 3C is an explanatory diagram showing that an inclination plane is obtained by determining points on marker rods Sa, Sb, and Sc of the marker 1 which form a triangle having the same lengths of sides as the lengths of the sides Lab, Lac, and Lbc obtained in the process explained in FIG. 3B.

The three marker rods Sa, Sb, and Sc are disposed in such a manner as to have different inclinations with respect to one another. The three marker rods Sa, Sb, and Sc are for example fixed in a skewed fashion with respect to one another (i.e., they are not in the same plane), and their respective inclination orientations and positional relation with respect to at least one point are known.

Based on such condition of the three marker rods Sa, Sb, and Sc, when one arbitrary point is selected from each of the marker rods (for example, point Pa is selected from the marker rod Sa), a triangle connecting the positions of the three selected points on the marker rods is formed and the lengths of the three sides the triangle are uniquely obtained.

In other words, when those lengths of the sides of that triangle is given, it is possible to uniquely identify the positions of the three selected points on the marker rods because the three marker rods Sa, Sb, and Sc have different inclinations with respect to one another and their inclinations and positional relation are known. As a result, it is possible to obtain the three dimensional positions of the three points.

Herein, the points of contact of the plate with the marker rods are denoted Oa, Ob, and Oc, each of which is represented by coordinates relative to Oc. That is, Oc is defined as an origin.

The marker rod Sc originates from the contact point Oc (0, 0, 0) and extends in the direction of the normal vector (0, 0, 1). That is, the marker rod Sc extends perpendicular to the plate.

The marker rod Sb extends from the contact point Ob ($xb0$, $yb0$, 0) in the direction of a vector ($\alpha b$, $\beta b$, $\gamma b$). The marker rod Sa extends from the contact point Oa ($xa0$, $ya0$, 0) in the direction of a vector ($\alpha a$, $\beta a$, $\gamma a$).

For a point Pa($xa$, $ya$, $za$) on the marker rod Sa, a point Pb($xb$, $yb$, $zb$) on the marker rod Sb, and a point Pc(0, 0, $zc$) on the marker rod Sc, the following equations hold:

$$(xb-xb0)/\alpha b = (yb-yb0)/\beta b = zb/\gamma b$$

$$(xa-xa0)/\alpha \alpha = (ya-ya0)/\beta a = za/\gamma a$$

Thus, positions of Pa and Pb are given as follows:

$$Pb = (\alpha b \times zb/\gamma b + xb0, \beta b \times zb/\gamma b + yb0, zb)$$

$$Pa = (\alpha a \times za/\gamma a + xa0, \beta a \times za/\gamma a + ya0, za)$$

The inclination detection apparatus determines the positions of the reflection points Pa, Pb, and Pc in the coordinate system relative to the origin Oc so that the combination of the lengths of the sides of the triangle obtained in the process explained with FIG. 3B matches with the combination of the lengths of the sides of a triangle formed by the above expressed points Pa, Pb, and Pc (i.e., translates the positional relation represented by the lengths of the sides of a triangle to relative positions on the marker rods). This makes it possible to obtain the positions of the reflection points in the marker 1 at step S32.

For example, when the inclination detection apparatus obtains a combination of lengths of the sides of the triangle as 30 cm, 50 cm, and 60 cm, the apparatus can uniquely identify positions of the reflection points Pa, Pb, and PC which form a triangle having the same combination of lengths of sides as that combination on the marker rods Sa, Sb, and Sc.

The translation into the relative coordinate system means, in other words, to determine a set of three points Pa, Pb, and Pc which at the same time satisfy: a constraint that the triangle formed by the three points have the same combination of lengths as those of the triangle derived from the reflection points, the positions of which are represented in the polar coordinate system (distance L to reflection point, emission angle $\theta$); and a constraint that the three points be respectively on the marker rods (each of the three points be on an extended line on a predetermined inclined vector extending from a point of contact O), where the rods are fixed in advance and points on the rods are represented in a relative coordinate system established by the marker rods.

Thus, calculation parameters (points of contact, vectors) for determining points on the three marker rods Sa, Sb, and Sc in the relative coordinate system are to be input to the inclination detection apparatus in advance by an administrator of the warehouse or the like.

At step S33, the inclination detection apparatus obtains an inclination plane from the positions of the reflection points Pa, Pb, and Pc which have been found in the marker in step S32. In other words, the inclination detection apparatus identifies the plane including the three reflection points in space coordinates as the inclination plane.

At step S34, the inclination detection apparatus determines whether the inclination plane obtained in step S33 is level. FIG. 4A shows a case in which the transfer vehicle 2 has an inclination with a front portion of the transfer vehicle 2 being raised (bends oneself back), where the inclination plane is formed such that the plane has an upward inclination in the travel direction of the vehicle (i.e., the vehicle looks up). Since the LRF 21 is fixed on the transfer vehicle 2, the inclination of the transfer vehicle 2 can be obtained based on the inclination of the inclination plane. That is, the angle between the inclination plane and the plate of the marker 1 (i.e., the level plane) corresponds to the angle of the inclination of the transfer vehicle 2 with respect to the floor surface (i.e., inclination of vehicle).

Figure 4B:
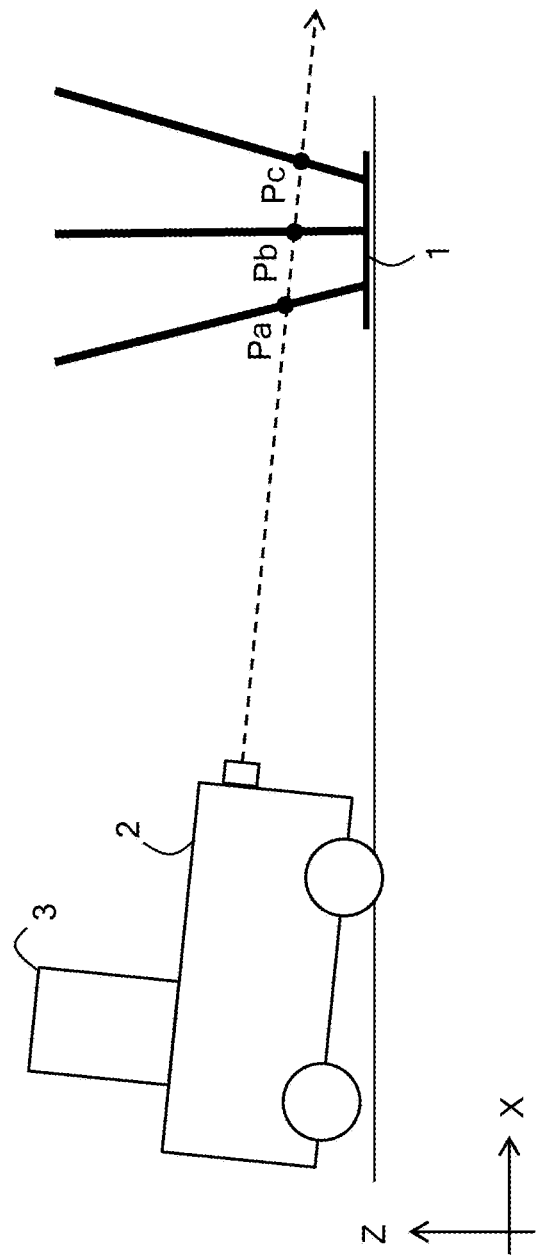

In contrast, FIG. 4B shows a case in which the transfer vehicle 2 has an inclination with the front portion of the transfer vehicle 2 being lowered (bends oneself forward), where the inclination plane is formed such that the plane has a downward inclination in the travel direction of the vehicle (i.e., the vehicle looks down).

Figure 4C:
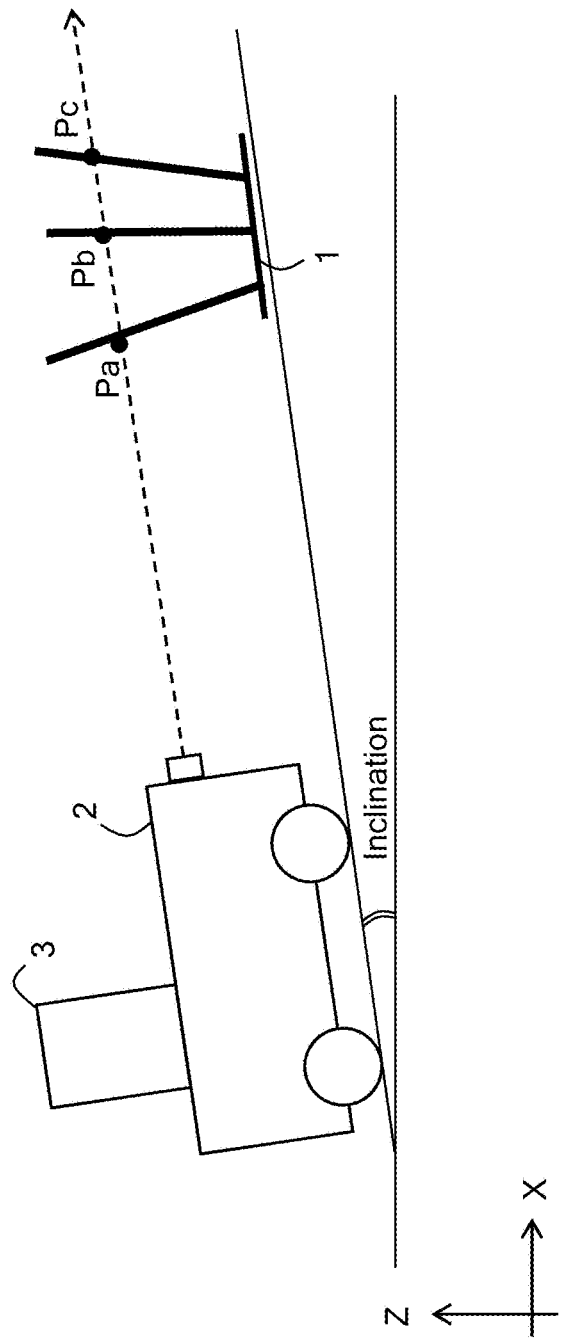

As another example, FIG. 4C shows a case in which the transfer vehicle 2 has an inclination with the front portion of the vehicle being raised when going up a slope, where the inclination plane is formed such that the vehicle looks up like the case of FIG. 4A.

The cases illustrated in FIGS. 4A, 4B, and 4C are each a case in which the inclination plane is not level and therefore the determination at step S34 is negative (No).

In FIG. 1C, the plate of the marker 1 is placed level, whereas in FIG. 4C, the plate is placed in an inclined manner (along the inclination of the slope). These cases are supported by using different sets of the parameters for obtaining the reflection points Pa, Pb, and PC (i.e., parameters consisting of contact points Oa, Ob, and Oc, and vectors representing the orientations of the marker rods), even though the marker 1 of FIG. 1C and the marker 1 of FIG. 4C are the same structure. For example, the marker rod Sc extends vertically along the normal vector (0, 0, 1) when the marker plate is placed level, and the marker rod Sc extends in a direction not perpendicular to a horizontal plane when the marker plate is placed in an inclined manner.

It is noted that FIGS. 4A to 4C show examples in which the inclination plane is not level only in the direction of the X axis. However, this is merely for ease of visual understanding purposes. The inclination detection apparatus is capable of detecting an inclination in the direction of the Y-axis as well.

Since the laser beam 22 scans the XY plane as indicated in FIG. 1B, it is possible to detect a plane inclined in the direction of the Y-axis (for example when the front and rear wheels 23 on the right side are lowered relative to the wheels on the left side) as well as a plane inclined in both the X-axis and Y-axis directions (for example when only the front right wheel 23 is lowered relative to the other wheels 23).

The inclination detection apparatus is able to obtain the amount of sinking of the transfer vehicle 2 in addition to the inclination of the transfer vehicle 2. The sinking here means that the transfer vehicle 2 is lowered as a whole by a predetermined height (amount of sinking), for example, due to an excessive heavy load of an article 3 to be transferred, with the transfer vehicle 2 being kept level.

As described in the description of step S32, the inclination detection apparatus is able to obtain each of the positions of the reflection points in marker 1 as space coordinates, thus the apparatus is also able to derive the amount of sinking of the transfer vehicle 2 by comparing the height of the inclination plane relative to the floor surface (the plate of the marker 1) with the height of the emission of the laser beam 22 (height in the Z-axis). Based on the information of the obtained amount of sinking, the inclination detection apparatus may utilize the information for example to warn an overloading of the article 3 when the sinking amount is greater than a predetermined threshold value.

At step S35, the inclination detection apparatus recognizes an abnormal condition when the inclination plane is not level, and corrects the inclination of the article 3 to a level position. Hereinafter the correction methods illustrated in FIGS. 5A to 5D will be described.

Figure 5A:
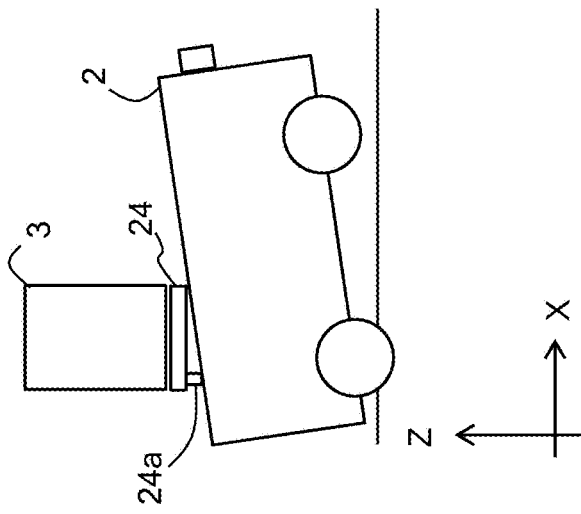
FIGS. 5A and 5B are views for explaining how an article to be transferred is restored to its level position according to an embodiment of the invention, where
Figure 5B:
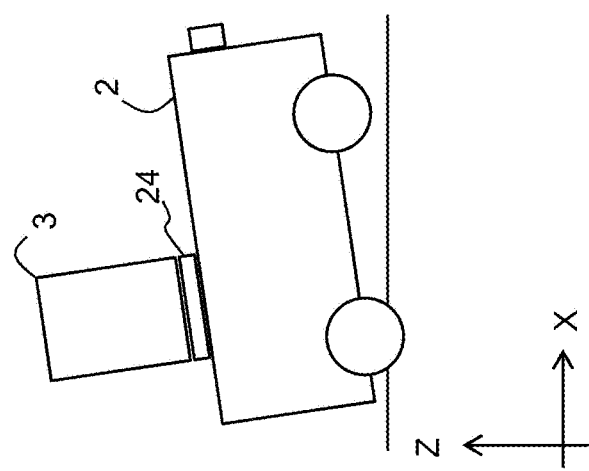

FIG. 5A is a plan view illustrating an inclined transfer vehicle with an article 3 loaded on a loading platform 24 of the vehicle. FIG. 5B is a plan view illustrating that the article 3 has been restored to its level position by adjusting the loading platform 24.

Assume that the inclination plane (i.e., loading platform 24) obtained in step S33 has an inclination with a rear portion of the inclination plane in the direction of travel being lowered. The article 3 loaded on the loading platform 24 in this state may fall backward.

Thus, the inclination detection apparatus sends to an elevating mechanism 24a for raising and lowering the loading platform 24 a control signal commanding the mechanism to change the inclination of the loading platform 24, in such a manner as to restore the inclination of the inclination plane to a level position. As a result, the transfer vehicle 2 remains inclined but the article 3 on the loading platform 24 becomes level and stabilized.

Figure 5D:
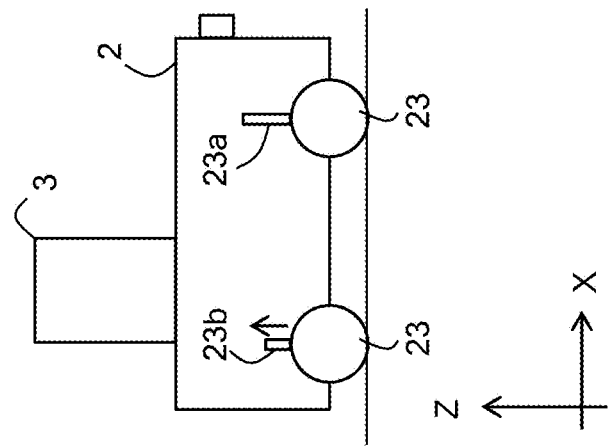
FIGS. 5C and 5D are views for explaining how an article to be transferred is restored to its level position according to an embodiment of the invention, where
Figure 5C:
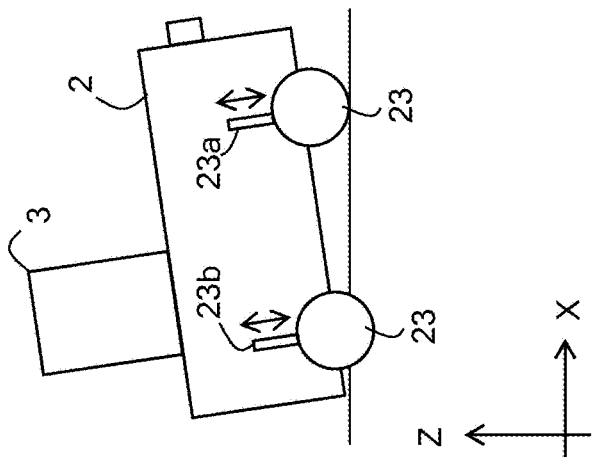

FIG. 5C is a plan view illustrating an inclined transfer vehicle 2 provided with actuators between the vehicle body and wheel shafts. FIG. 5D is a plan view illustrating that the whole of the transfer vehicle 2 has been restored to its level position by adjusting the actuators.

The wheels 23 are provided with actuators 23a for front wheels and actuators 23b for rear wheels. These actuators are each provided between the vehicle body and a wheel shaft, and can be operated so as to modify the inclination of the vehicle body by the actuator pressing the wheel shaft. The actuators are provided with a screw or worm gear mechanism so as to maintain the posture of the vehicle even while power is off.

Assume that the inclination plane (i.e., loading platform 24) obtained in step S33 has an inclination with a rear portion of the inclination plane in the direction of travel being lowered. The inclination detection apparatus corrects the inclination of the vehicle body by driving the actuators so that the heights of the front wheels become level with those of the rear wheels. As a result, the transfer vehicle 2 becomes level, and thus the loaded article 3 also becomes level and stabilized.

Figure 6A:
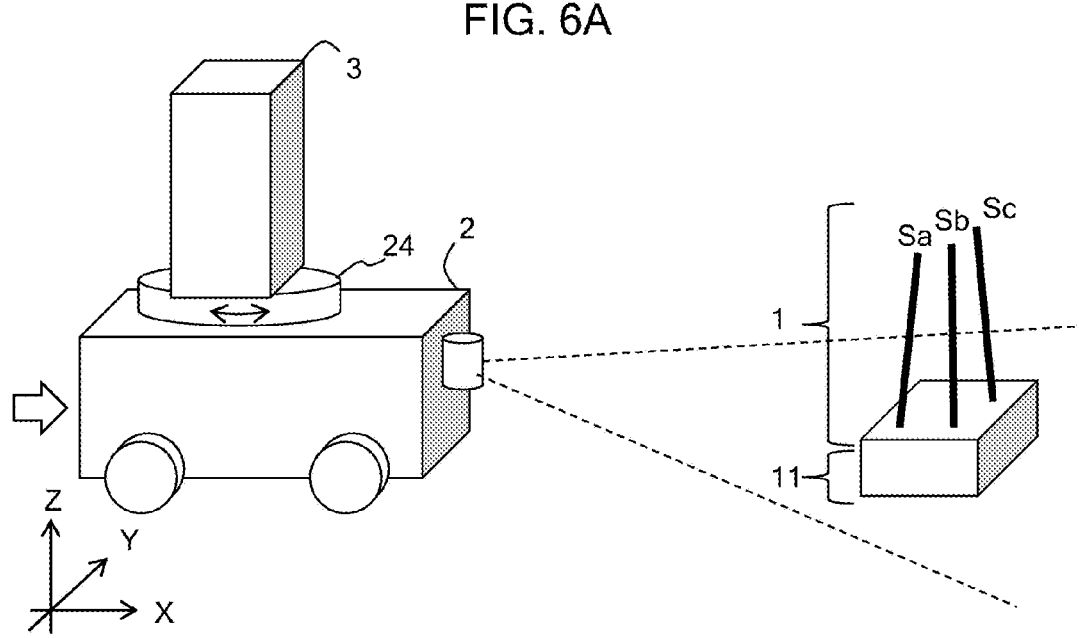
FIG. 6A is a perspective view illustrating an embodiment of the invention which is different from the embodiment illustrated in FIG. 1A.

FIG. 6A is a perspective view illustrating an embodiment of the invention which is different from the embodiment illustrated in FIG. 1A. The transfer vehicle 2 is provided thereon with a loading platform 24, on which an article 3 to be transferred is to be loaded and which is structured as a rotatable stage capable of changing the inclination angle thereof. An article 3 broader than the vehicle width may collide with a narrow passage. A tall article 3 may fall down even with a small inclination thereof due to a high center of gravity. So the inclination detection apparatus controls (rotates) the rotatable stage to restore the inclination thereof to its level position, thus preventing a collision or a fall of the article 3.

The marker 1 is not limited to be placed on the same height as the floor surface on which the transfer vehicle 2 travels. It may be, for example, placed on a pedestal 11 the upper surface of which is parallel to the floor surface.

Figure 6B:
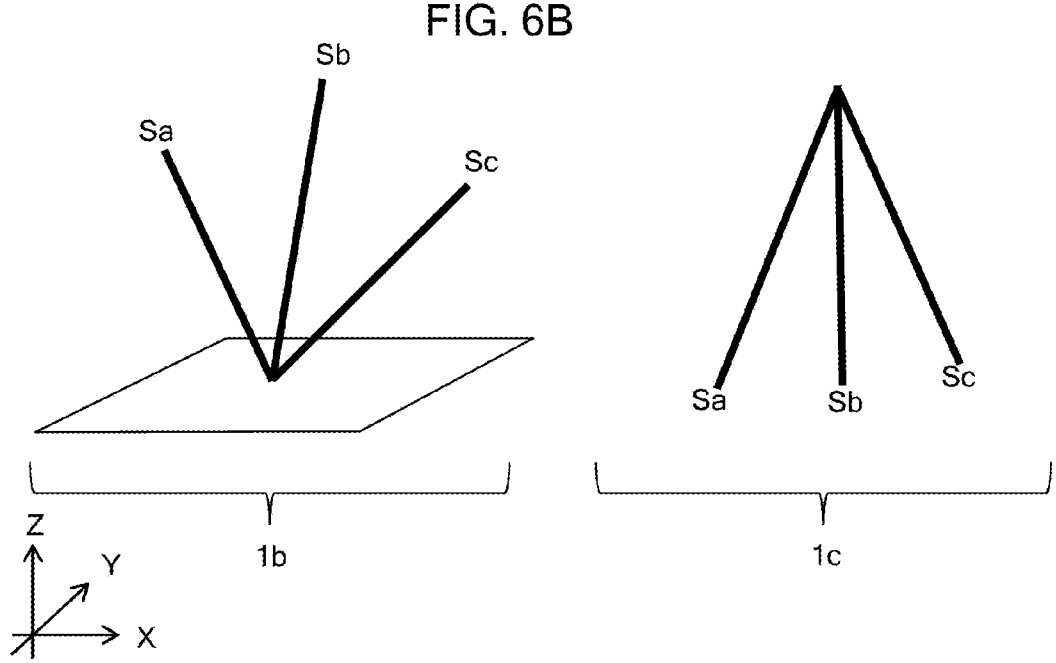
FIG. 6B is a perspective view illustrating embodiments of the marker which are different from the marker illustrated in FIG. 1A.

FIG. 6B is a perspective view illustrating embodiments of the marker 1 which are different from the embodiment illustrated in FIG. 1A. The three marker rods Sa, Sb, and Sc are not limited to be skewed. They may be structured to intersect at a point in a space, provided that inclinations of the three rods Sa, Sb, and Sc are different with respect to one another. The marker 1b is an example in which the marker rods intersect at the bottom plate. By this structure, the marker 1b may have a small amount of an occupied volume, which permits the marker 1b to be readily transferred. The marker 1c is an example in which the marker rods intersect at a top portion thereof. By this structure, with the three marker rods Sa, Sb, and Sc being stabilized in a space by the same principle as the tripod for a camera, the bottom plate of the marker can be eliminated and thus the occupied area can be reduced.

Further, instead of the marker 1c having an intersection at the top portion thereof, the marker 1c may be structured such that the marker rods in the vicinity of the intersection are omitted.

In the above described embodiments of the invention, the inclination detection apparatus uses, when detecting the inclination of the transfer vehicle 2 on which the article 3 to be transferred has been loaded, the information obtained from the laser beam 22 emitted from the LRF 21 of the transfer vehicle 2 to the marker 1. The marker 1 is composed of three marker rods Sa, Sb, and Sc, the inclinations of which are different with respect to one another, and an inclination plane representing the inclination of the transfer vehicle 2 is uniquely obtained based on three reflection points of the laser beam 22.

As described above, the inclination detection apparatus in combination with the marker 1 and the LRF 21 is able to restore a loaded article 3 to a level position. Therefore, it is possible to prevent the article 3 from falling from the transfer vehicle 2 and prevent a collision of the article 3 protruding from the transfer vehicle 2 with a passage. Further, since it is possible to expect that the article 3 do not protrude from the transfer vehicle 2, the transfer route of the transfer vehicle 2 can be narrowed insofar as it is possible to transfer the article 3, thereby improving the storage efficiency of the warehouse.

Since the LRF 21 is able to autonomously find a maker 1 existing therearound by emitting a laser beam 22, it is possible to eliminate time and effort of an administrator to input the position of the marker 1 in the warehouse in advance. Therefore, when making changes in the layout of the warehouse, the marker 1 may be merely hand-carried as is to change its position.

The present invention is not limited to the above described embodiments, but includes various variations. For example, the above-described embodiments have only been described in detail for a better understanding of the invention and are therefore not necessarily limited to a configuration containing all the described constituent elements.

In addition, part of the configuration of a certain embodiment may be replaced with the configuration of another embodiment, and the configuration of a certain embodiment may be modified by adding a configuration of another embodiment.

Further, a portion of the configuration in each of the embodiments may be modified by adding other configuration, by deletion, or by replacing with other configuration. Furthermore, the above-described configurations, functions, processing portions, processing means, and so on may be realized in hardware by designing some or all of them, for example, using an integrated circuit.

Additionally, the above-described configurations, functions, and so on may be realized by software such that a CPU interprets programs that achieve respective functions.

Information such as programs, tables, and files for realizing the individual functions may be stored in a storage device such as memory, a hard disk, or a solid state drive (SSD), or a recording medium such as an integrated circuit (IC) card, a secure digital (SD) card, and a digital versatile disc (DVD).

In addition, the control lines and information lines represent those that are considered to be necessary for description purposes, and do not necessarily represent all the control lines and information lines that are necessary for a product. In practice, almost all structures may be considered to be mutually connected.

REFERENCE SIGNS LIST

1 Marker (equipment for inclination detection)
2 Transfer vehicle (Mobile body)
3 Article to be transferred
21 Laser range finder (LRF)
22 Laser beam
23 Wheels
24 Loading platform
24*a* Elevating mechanism for raising and lowering loading platform
23*a* Actuators for front wheels
23*b* Actuators for rear wheels
Pa, Pb, Pc Reflection points
Sa, Sb, Sc Marker rods

What is claimed is:

1. A method for detecting an inclination of a mobile body using an inclination detection apparatus having a processor and a storage device, the storage device storing relative positional information of three marker rods having different inclinations with respect to one another, the mobile body being provided with a laser range finder irradiating surrounding objects with a laser beam to light a point on each of the three marker rods as a reflection point from which the laser beam is reflected back to the laser range finder, the method being carried out by the processor and comprising the steps of:
obtaining positional relation information of the reflection points of the laser beam on the three marker rods,
obtaining relative positions of the reflection points with respect to one another on the three marker rods by determining points on the three marker rods corresponding to the obtained positional relation information of the reflection points based on the relative positional information stored in the storage device, and
identifying an inclination plane that passes through the reflection points as the inclination of the mobile body based on the obtained relative positions of the reflection points.

2. The method set forth in claim 1,
wherein the three marker rods, having different inclinations with respect to one another, are skewed with respect to one another.

3. The method set forth in claim 2,
the method further comprising sending a control signal to a controller controlling an inclination of the whole of the mobile body, the control signal commanding the controller to change the inclination of the whole of the mobile body in such a manner as to restore the inclination plane to a level position.

4. The method set forth in claim 2,
wherein the mobile body is further provided with a loading platform on which an article to be transferred is to be loaded, the method further comprising sending a control signal to a controller controlling an inclination of the loading platform, the control signal commanding the controller to change the inclination of the loading platform in such a manner as to restore the inclination plane to a level position.

5. The method set forth in claim 1,
the method further comprising sending a control signal to a controller controlling an inclination of the whole of the mobile body, the control signal commanding the controller to change the inclination of the whole of the mobile body in such a manner as to restore the inclination plane to a level position.

6. The method set forth in claim 1,
wherein the mobile body is further provided with a loading platform on which an article to be transferred is to be loaded, the method further comprising sending a control signal to a controller controlling an inclination of the loading platform, the control signal commanding the controller to change the inclination of the loading platform in such a manner as to restore the inclination plane to a level position.

7. An inclination detection apparatus for detecting an inclination of a mobile body, the mobile body being provided with a laser range finder irradiating surrounding objects with a laser beam to light a point on each of three marker rods as a reflection point from which the laser beam is reflected back to the laser range finder, the inclination detection apparatus comprising:
a storage device storing relative positional information of the three marker rods, wherein the three marker rods have different inclinations with respect to one another, and
a processor configured to:
obtain positional relation information of the reflection points of the laser beam on the three marker rods, obtain relative positions of the reflection points with respect to one another on the three marker rods by determining points on the three marker rods corresponding to the obtained positional relation information based on the relative positional information stored in the storage device, and identify an inclination plane that passes through the reflection points as the inclination of the mobile body based on the obtained relative positions of the reflection points.

8. The inclination detection apparatus set forth in claim 7, wherein the three marker rods, having different inclinations with respect to one another, are skewed with respect to one another.

9. The inclination detection apparatus set forth in claim 8, wherein the processor is further configured to send a control signal to a controller controlling an inclination of the whole of the mobile body, the control signal commanding the controller to change the inclination of the whole of the mobile body in such a manner as to restore the inclination plane to a level position.

10. The inclination detection apparatus set forth in claim 8, wherein the mobile body is further provided with a loading platform on which an article to be transferred is to be loaded, and wherein the processor is further configured to send a control signal to a controller controlling an inclination of the loading platform, the control signal commanding the controller to change an inclination of the loading platform in such a manner as to restore the inclination plane to a level position.

11. The inclination detection apparatus set forth in claim 7, wherein the processor is further configured to send a control signal to a controller controlling an inclination of the whole of the mobile body, the control signal commanding the controller to change the inclination of the whole of the mobile body in such a manner as to restore the inclination plane to a level position.

12. The inclination detection apparatus set forth in claim 7, wherein the mobile body is further provided with a loading platform on which an article to be transferred is to be loaded, and wherein the processor is further configured to send a control signal to a controller controlling an inclination of the loading platform, the control signal commanding the controller to change an inclination of the loading platform in such a manner as to restore the inclination plane to a level position.

* * * * *